3,055,782
SOLID COMPOSITE RUBBER BASE PROPELLANTS CONTAINING QUATERNIZING AGENTS AND METAL OXIDES
James E. Pritchard, William M. Hutchinson, and Paul S. Hudson, Bartlesville, Okla., assignors to Phillips Petroleum Company, a corporation of Delaware
No Drawing. Filed Oct. 17, 1955, Ser. No. 541,034
41 Claims. (Cl. 149—20)

This invention relates to solid propellants which are particularly useful in rocket motors, including assist take-off motors. In one aspect it relates to solid rocket propellants comprising an oxidant and a solid free sulfur-free binder. In another aspect it relates to a solid rocket propellant obtained by incorporating an oxidant in a binder comprising a polymer of a polymerizable heterocyclic nitrogen base of the pyridine or the quinoline series and curing the composition with a quaternizing agent and a metal oxide along with such other compounding ingredients as desired but in the absence of free sulfur.

An object of our invention is to provide a solid propellant for jet propulsion motors.

Another object of our invention is to provide a solid propellant devoid of added elementary sulfur for jet propulsion motors.

Still another object of our invention is to provide a solid propellant produced by admixing a solid oxidant and a polymer of a polymerizable heterocyclic nitrogen base of the pyridine or quinoline series and curing the polymer in the presence of a quaternizing agent and a metal oxide in the absence of added elementary sulfur.

And another object of our invention is to provide a method of manufacturing such a solid propellant.

Yet another object of our invention is to provide a solid rocket propellant comprising a solid oxidant and such a solid polymeric material, all of which is devoid of added elementary sulfur and to provide a method for the manufacture of such a solid propellant.

Other objects and advantages will be apparent from the following disclosure.

We accomplish the foregoing and other objects by providing a solid propellant composition produced by mixing a solid oxidant, a metal oxide, a heterocyclic nitrogen base polymer and a curing agent free of added elementary sulfur and heating the mixture to effect a cure.

We have found that polymers, that is, homopolymers and copolymers, of polymerizable heterocyclic nitrogen bases of the pyridine and quinoline series are cured by heating with a quaternizing agent and a metal oxide in the absence of free sulfur. We have found that solid propellant compositions exhibiting good physical properties are obtained with this type of free sulfur-free polymer. In these compositions a homopolymer or copolymer of a polymerizable heterocyclic nitrogen base of the pyridine or quinoline series is mixed with a quaternizing agent, a metal oxide, a solid oxidant and such other compounding ingredients as desired, and which are free of free sulfur and the composition cured.

In the rubber industry free sulfur is a widely used vulcanizing agent. However, it is recognized that when small quantities of free sulfur are employed in a compounding recipe, products having better aging characteristics are obtained than when large amounts of sulfur are present. Compounding recipes containing no free sulfur as a vulcanizing agent are, of course, still better regarding aging, providing other characteristics are satisfactory. In the production of solid propellants, it is particularly important that the compositions remain stable upon aging. This invention provides a method for curing solid propellant compositions without the use of free sulfur and which produces a binder for a solid propellant oxide, which binder is stable upon aging.

It is essential that both a quaternizing agent and a metal oxide be present in the propellant compositions herein described. Suitable curing is not effected in the presence of a metal oxide alone. Compositions having much higher tensile strength are obtained when using both a quaternizing agent and a metal oxide than when using a quaternizing agent alone.

Metal oxides have been used in curing conjugated diene polymers and copolymers containing halogen, such as polyvinyl chloride. Quaternary ammonium salts of polyvinylpyridine and copolymers of vinylpyridine with divinylpyridine and trivinylbenzene have been prepared by treating the polymers with an alkyl halide, an alkyl sulfate, or an alkyl aryl sulfonate. Natural and synthetic rubbers have been used as binders for solid explosive. To our knowledge prior art does not teach the curing of vinylpyridine or vinylquinoline polymers in the absence of free sulfur and using such cured materials as binders in solid propellant compositions.

The terms "cure, cured, etc.," are herein used to include both quaternizing and cross linking with metal oxides.

These solid propellant compositions are prepared by mixing the polymeric material, metal oxide, oxidant, and such other compounding ingredients as desired, and without the addition of free sulfur and then curing the mixture. These compositions are prepared without added free sulfur.

Specifically, our propellants are prepared by mixing a solid oxidant, a polymer of a polymerizable heterocyclic nitrogen base, a metal oxide, a quaternizing agent and such other compounding ingredients as desired, and excluding free sulfur, and heating the mixture. The polymer of a polymerizable heterocyclic nitrogen base can be a homopolymer of a polymerizable heterocyclic nitrogen base, or can be a copolymer of a heterocyclic nitrogen base with a conjugated diene or with a conjugated diene and another polymerizable vinyl compound such as an acrylate. Heating of this mixture effects a reaction between the polymer, the quaternizing agent and the metal oxide to produce a solid binder for the oxidant. This so produced binder also serves as fuel for the oxidant.

The polymerizable heterocyclic nitrogen base compounds of the pyridine and quinoline series which we use in preparing the homopolymers and copolymers employed in our invention include such compounds as 2-vinylpyridine, 5-methyl-2-vinylpyridine, 5-ethyl-2-vinylpyridine, 2-methyl-5-vinylpyridine, 2,5-divinylpyridine, 3-methyl-2,5-divinylpyridine, 4-methyl-3-vinylpyridine, 2-isopropenylpyridine, 5-propyl-2-isopopenylpyridine, 2-octyl-5-vinylpyridine, 2-vinylquinoline, 8-ethyl-2-vinylquinoline, 4-hexyl-5-vinylquinoline, 1-vinylisoquinoline, 5-methyl-1-isopropenylisoquinoline, 1,8 - divinylisoquinoline, 2,5-divinylquinoline, 6,7 - dimethyl - 2,5 - divinylquinoline, etc. These specifically disclosed heterocyclic nitrogen base compounds are polymerizable and are used in preparing the propellant composition of our invention. These specifically disclosed heterocyclic nitrogen base compounds form homopolymers, and copolymers with conjugated dienes and with polymerizable monovinyl compounds, all of which are used in producing the binders of our invention.

The polymerizable heterocyclic nitrogen base component is employed in amounts in the range between 1 and 100 parts by weight of the monomeric material.

The conjugated dienes which are used in producing copolymers for the production of our propellant binder are preferably conjugated diolefins which contain four to six carbon atoms per molecule, and include 1,3-butadiene, isoprene, piperylene, methylpentadiene, 2,3-dimethyl-1,3-butadiene, chloroprene and others. However, conjugated dienes having more than six, such as eight, carbon atoms per molecule are also used. Furthermore, various alkoxy, such as methoxy and ethoxy, and cyano derivatives of these conjugated dienes are also used in producing the solid propellant of our invention.

For the production of the polymers employed in the practice of our invention the amount of a conjugated diolefin employed is generally within the range of 0 to 99 parts per 100 parts by weight of the total monomeric material in a preferred range of from 25 to 98 parts by weight per 100 parts of the total monomeric material and the amount of copolymerizable heterocyclic base employed is in the range from 75 to 2 parts per 100 parts by weight of the total monomeric material, the proportions of the monomeric material employed depending upon the type of copolymer desired.

The other polymerizable monovinyl compounds which are used for copolymerization with the above disclosed polymerizable heterocyclic nitrogen bases and conjugated dienes are the polymerizable monovinyl compounds devoid of acidic groups and include esters of acrylic and methacrylic acids, such as, methyl acrylate, ethyl acrylate, propyl acrylate, butyl acrylate, and the corresponding methacrylates, styrene, alpha-methyl styrene, various alkyl and alkoxy styrenes, acrylonitrile, methacrylonitrile, methyl vinyl ketone, methyl isopropenyl ketone, methyl vinyl ether, vinyl acetate, and the like. Esters of acrylic acid and methacrylic acid are also used. Other polymerizable materials such as vinyl chloride, vinylidene chloride, halogen-substituted esters of acrylic acid and methacrylic acid, halogen-substituted styrene, conjugated dienes, etc., are also employed in the production of the copolymers and are within the scope of our invention.

The other polymerizable monovinyl compounds (the herein disclosed acrylates, methacrylates, etc.) employed in producing our composition can, if desired, be considered to replace a portion of the conjugated diene. It is preferable that at least a small proportion of diene be included in the composition to impart elasticity, or in other words, to increase resistance against breakage upon handling the finally produced propellant. The other polymerizable monovinyl compound replaces, when desired, from 0% to 99% by weight of the conjugated diene in the copolymer.

It is to be understood that mixtures of polymerizable heterocyclic nitrogen bases as well as mixtures of the dienes and of the other polymerizable monovinyl compounds are used in preparing our polymers.

The metal oxides which are most frequently preferred are those of lead (litharge), zinc and magnesium. Other metal oxides which are sometimes used are cadmium oxide, mercury oxide, tin oxide, calcium oxide, barium oxide, strontium oxide, vanadium oxide, manganese oxide, iron oxide, cobalt oxide, nickel oxide and mixtures of two or more of these oxides. Mixtures of two or more of these metal oxides are employed, when desired.

The amount of the metal oxide or metal oxides used will generally be in the range of 0.5 to 200 parts by weight per 100 parts by weight of the polymeric material.

Quaternizing agents which are used in producing the thermosetting solid propellant binder herein disclosed are those which include an active halogen atom attached to a carbon atom in a compound which is not an acid. The following enumerated compounds are used as quaternizing agents: various alkyl halides such as methyl iodide, methyl bromide, ethyl iodide, propyl iodide, hexyl iodide, nonyl bromide and cetyl bromide; the various alkylene halides such as methylene iodide, ethylene bromide, propylene dichloride, butene dibromide and octene dibromide; the various substituted alkanes and cycloalkanes necessarily including the above alkyl and alkylene halides, which contain at least one hydrogen atom attached to a carbon atom such as bromoform, 1,2-dichloropropane, 1, 2-dibromobutane, ethylene chlorohydrin, iodoform, chloracetates, chlormaleates, benzoyl chloride, benzene sulfonyl chloride, benzyl chloride, benzal chloride, benzotrichloride and methylbenzene sulfonate. Other quaternizing agents which are employed in the practice of our invention include the polyhalogenated cycloalkenes such as hexachlorocyclopentadiene. The foregoing enumeration is not intended to include all the possible, suitable quaternizing agents but is only representative since many others can be used. If an organic compound contains an active halogen atom attached to a carbon atom or contains a similar active quaternizing group, and if the compound is not an acid it is useful as a quaternizing agent in our invention. In general, active quaternizing agents such as organic halides, and the like, which contain not more than 20 carbon atoms per molecule and contain at least one halogen or equivalent quaternizing group, for example, an aryl-alkyl halide, or the like, are also used in the practice of this invention (these compounds may be characterized as containing active halogen or equivalent quaternizing group). Those compounds which contain the configuration

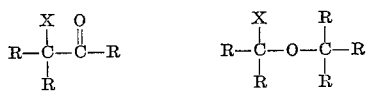

wherein X is a halogen atom such as chlorine, bromine and iodine and the R's represent oxygen, hydrogen or carbon valence linkages to their respective carbon atoms are used in our invention.

In effecting the quaternization reaction to produce our solid, polymeric materials it is pointed out that the nitrogen atoms of the heterocyclic base nuclei (units) in the resulting solid material each have their five valence bonds attached to atoms (or radicals) other than a hydrogen atom, e.g. four nitrogen to carbon bonds and one nitrogen to halogen bond. In other words the available valencies of the nitrogen atoms contained in the polymerized heterocyclic base nuclei of the polymer are satisfied by atoms (or radicals) and ions other than hydrogen.

The reactions of a conjugated diene-heterocyclic base copolymer, the diene-monovinyl compound-heterocyclic base polymer and heterocyclic nitrogen base homopolymers with quaternizing agents yield products which contain the characteristic nitrogen valencies in the recurring nitrogen base units of the polymers. In distinction, if the pyridine nucleus (unit) of the polymer were reacted with an acid acting substance (mineral acid, organic acid or the like) one of the two available nitrogen valencies would be satisfied by a hydrogen atom and accordingly would not be a quaternary compound of the type contemplated. The quaternary salts tend to be less water soluble whereas pyridinium salts formed by reaction with an acid acting compound (whereby a hydrogen atom is attached to a nitrogen atom) tend to be more water soluble. Furthermore, the quaternizing reaction of this invention is readily controlled since it proceeds rather slowly. Quaternary salts are distinguished over the other pyridinum or quinolinium salts in that they are derived from strong bases. Also pyridinium or quinolinium salts (other than a quaternary salt) form free pyridine or quinoline, water and a salt when reacted with a strong base. Therefore, suitable quaternizing agents are those compounds which when reacted with the nitrogen atom of the heterocyclic base do not attach or link a hydrogen atom thereto. Expressed differently, the quaternizing agents of this invention are those compounds XY which react with the nitrogen atom of the heterocyclic base nucleus of the polymer or with a compound such as pyridine or quinoline to yield a material which may be characterized by the formulas

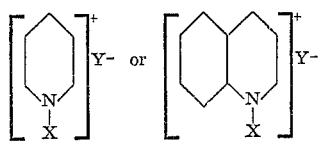

wherein X is any molecular fragment, such as an organic radical, other than hydrogen and Y is the remaining molecular fragment such as an atom or radical (anion).

The quaternizing agents used in preparing our propellant composition will preferably substantially completely convert the heterocyclic nitrogen unit of the polymer to the corresponding quaternary unit. If desired, more or less than the stoichiometric amount of quaternizing agent can be employed depending upon the physical properties desired in the solid polymeric material. For example, only about 10 to 50 percent of the required stoichiometric amount can be used, or 10 percent excess over the stoichiometric amount theoretically required can be employed. We prefer to employ a quaternizing agent which will be completely reacted whether or not all heterocyclic nitrogen units of the polymer are converted to the corresponding quaternary unit.

Of the alkyl halides, the alkyl bromides and alkyl iodides having from 1 to 20 carbon atoms are preferred in the practice of this invention as quaternizing agents. Of the alkylene halides, the alkylene bromides and alkylene iodides having from 1 to 20 carbon atoms are preferred in the practice of this invention. Similarly, of the substituted alkanes which include the above-referred alkyl and alkylene halides, those which contain at least one hydrogen atom attached to a carbon atom and which contain from 1 to 20 carbon atoms and at least one substituent halogen group are preferred in the practice of this invention. Of the substituted aromatic compounds which are employed as quaternizing agents, the halogen, sulfonate or nitro substituted benzene compounds are preferred, especially the aralkyl halides and the aryl halides containing not more than 20 carbon atoms. Mixtures of two or more of the above given quaternizing agents are employed in the practice of this invention as well as any individual quaternizing agent.

The temperatures at which the quaternizing agent is reacted to effect the solid polymer formation are usually in the range between 0° and 175° C., although higher or lower temperatures are used, if desired. The time required to effect the reaction is dependent upon the temperature employed and usually varies from about a few minutes, 5 to 10 minutes, to about 10 hours or more, even in some cases as high as 80 hours.

The homopolymers and copolymers from which solid polymers are prepared to produce solid rocket propellants in accordance with our invention are produced by any suitable method, e.g., emulsion polymerization. These polymers, if liquid, range from very fluid to very viscous material and range in viscosity measurement in SUS at 100° F. from below about 1000 up to about 10,000 or higher, such as 400,000. If solids, these copolymers and homopolymers range from soft to rather hard rubbers, preferably having a ML-4 Mooney value in the range 10 to 100 and higher. The average molecular weight of these materials range from about 1000 to about 150,000 although higher or lower molecular weight materials can be used in the practice of our invention. They usually have an average molecular weight in the range about 2,000 to about 50,000. Many polymerization recipes can be used for preparing the copolymers and homopolymers employed in the practice of this invention.

It is pointed out that the resulting solid polymer material acts not only as a binder but also as the fuel for the solid oxidant blended therewith in the solid rocket compositions of our invention.

Oxidants used in the practice of our invention are those oxygen-containing solids which are employed as oxidizing agents and/or which readily give up oxygen and include alkali metal and ammonium chlorates, perchlorates, and nitrates, such as ammonium nitrate, sodium nitrate, potassium nitrate, sodium chlorate, potassium perchlorate, and the like. The oxidants which are compounded in the preparation of the solid rocket propellants of this invention are preferably ammonium nitrate and the potassium, ammonium, and sodium perchlorates. Although the ammonium, potassium, and sodium salts are preferred, salts of other metals such as lithium, especially the alkaline earth metals such as calcium, strontium, barium, and magnesium, as well as aluminum, boron and the like can also be employed. In the preparation of the solid rocket propellants of this invention the oxidants are powdered to sizes preferably within the range of 40 to 325 mesh. The powdered oxidants and the copolymer or homopolymer and metal oxide, together with a suitable quaternizing agent are admixed together to form a paste or homogeneous solid mass. The amount of solid oxidant employed in the admixture is usually a major amount of the total admixture, generally in the range from about 50 to about 90 percent by weight of the total admixture. If desired, a minor amount of oxidant, less than 50 percent by weight, can be employed.

As indicated hereinbefore the quaternizing agent can be employed in an amount below or above that theoretically required to react with the copolymer and with the homopolymer. The resulting admixture is then heated, usually after suitable forming or pelleting, preferably in a suitable mold, or extrusion, to a temperature from 0° to 175° C. and at a suitable pressure, such as in the range from about atmospheric to about 2000 p.s.i.g., to prevent the escape of the usually more volatile quaternizing agent. The heating period is determined by the oxidant employed, the polymer composition, the quaternizing agent employed, the metal oxide and other factors. In addition to the above-mentioned ingredients various auxiliary materials are employed in the solid propellant composition of this invention and include the various so-called oxidation catalysts such as Milori blue, ammonium dichromate, rouge, etc. As indicated hereinabove the pressure employed is determined by the temperature and the quaternizing agent used. If the reaction is carried out at a room temperature or below, atmospheric pressure is frequently employed, however, when the admixture is heated to an elevated temperature, it is preferred to operate at pressures sufficiently high to prevent loss of volatile quaternizing agents. The forming or pelleting pressure employed prior to the reaction or even accompanying the reaction may be any sufficient and suitable pressure. Pressure is used when curing in a mold or in such cases as when using a volatile quaternizing agent. Preference is to employ a quaternizing agent of low volatility in order to cure the composition at atmospheric pressure.

The invention and the advantages to be obtained thereby are further set forth and illustrated in the following examples.

*Example 1*

Simulated solid propellant compositions were prepared using the following formulation:

| | Parts by weight |
|---|---|
| 90/10 butadiene/2-methyl-5-vinylpyridine copolymer, 28 ML-4 | 100 |
| Carbon black (Philblack A) | 20 |
| Benzotrichloride | 4.38 |
| Litharge (PbO) | Variable |
| Aerosol OT [1] | 1.0 |
| Iron oxide | 15 |
| TP-90B [2] | 20 |
| Ammonium chloride [3] | 50 |

[1] Dioctyl ester of sodium sulfosuccinic acid.
[2] Dibutyl carbitol formal.
[3] Used instead of the oxidant.

The compositions were cured 15 hours at 220° F. Results of tensile and elongation test were as follows:

| PbO phr.[1] | Benzotri-chloride, phr.[1] | Tensile, p.s.i. | Elongation, percent |
|---|---|---|---|
| 0 | 4.38 | 185 | 650+ |
| 2 | 4.38 | 205 | 650 |
| 3 | 4.38 | 280 | 650+ |
| 5 | 4.38 | 315 | 650+ |
| 10 | 4.38 | 400 | 650 |
| 10 | 0 | 0 | 0 |

[1] Parts per 100 parts rubber.

*Example II*

A solid propellant composition was prepared using the following formulation.

| | Parts by weight |
|---|---|
| Ammonium nitrate | 75 |
| 90/10 butadiene/2-methyl-5-vinylpyridine copolymer, 20 ML-4 | 15 |
| Carbon black (Philblack A) | 3 |
| Diethyl bromomalonate | 3 |
| Flexol TOF [1] | 3.2 |
| Zinc oxide | 0.8 |

| | |
|---|---|
| Mixing time, hours | 2 |
| Molding conditions: | |
| Injection pressure, p.s.i. | 3,100 |
| Dwell pressure, p.s.i. | 5,200 |
| Density of section near bottom of grain, g./cc. | 1.42 |

[1] Tri-2-ethylhexyl phosphate.

In Example I, above, it is noted that the stimulated propellant made without use of a metal oxide had a tensile strength of 185 pounds per square inch. The simulated propellant in which 10 phr. of PbO (litharge) was used had a tensile strength of 400 pounds per square inch and an elongation of 650% at the break point. Simulated propellant compositions produced with intermediate amounts of PbO gave intermediate values of tensile strength.

*Example III*

Additional solid propellants were also prepared employing the following formulations:

PROPELLANT FORMULATION

| | No. 1 | No. 2 |
|---|---|---|
| Ammonium Nitrate | 85 | 85 |
| Milori Blue [1] | 2 | 2 |
| Magnesium Oxide | 0.5 | 0.5 |
| Binder | 15 | 15 |

BINDER FORMULATION

| | | |
|---|---|---|
| Butadiene-MVP Copolymer | 100 | 100 |
| Carbon Black [2] | 20 | 20 |
| Flexamine [3] | 3 | 3 |
| Lauryl bromide | 14 | |
| Benzotrichloride | | 11 |

EVALUATION

| | | |
|---|---|---|
| Temperature, °F | 70 | 70 |
| $S_T$ (Ultimate Tensile Strength), p.s.i. | 328 | 347 |
| $\epsilon_T$ (Tensile Elongation), percent | 13.2 | 10.4 |
| $E_T$ (Modulus of Elasticity), p.s.i. | 4,100 | 6,400 |

[1] Milori Blue is a complex iron cyanide.
[2] Carbon black is Philblack A.
[3] Flexamine is 65% diarylamine-ketone reaction product and 35% N,N'-diphenyl-p-phenylenediamine.

While certain embodiments of the invention have been described for illustrative purposes, the invention obviously is not limited thereto.

We claim:

1. A composition consisting essentially of: (1) 100 parts by weight of a polymer of a polymerizable heterocyclic nitrogen base compound selected from the group consisting of vinyl substituted and isopropenyl substituted pyridines and quinolines, and nuclear alkyl substituted derivatives thereof wherein the nuclear alkyl substituent contains from 1 to 8 carbon atoms; (2) from 0.5 to 200 parts per 100 parts of said polymer of a metal oxide selected from the group consisting of magnesium oxide, zinc oxide, litharge, iron oxide, barium oxide, strontium oxide, vanadium oxide, cobalt oxide, nickel oxide, and mixtures of said oxides; (3) from 50 to 90 weight percent of the total composition of a solid inorganic oxidizing salt; and (4) an organic non-acid, elementary sulfur-free quaternizing agent capable of forming fourth and fifth valence bonds between the heterocyclic nitrogen atoms of said polymer and atoms other than hydrogen of said quaternizing agent, said quaternizing agent being employed in an amount from about 10 weight percent of the stoichiometric requirement to about 10 weight percent over the stoichiometric requirement necessary to quaternize the nitrogen atoms in said polymer when said composition is cured.

2. The composition of claim 1 wherein said metal oxide is magnesium oxide.

3. The composition of claim 1 wherein said metal oxide is zinc oxide.

4. The composition of claim 1 wherein said metal oxide is litharge.

5. The composition of claim 1 wherein said metal oxide is iron oxide.

6. The composition of claim 1 wherein said metal oxide is cadmium oxide.

7. The composition of claim 1 wherein said quaternizing agent is benzotrichloride.

8. The composition of claim 1 wherein said quaternizing agent is benzyl chloride.

9. The composition of claim 1 wherein said quaternizing agent is benzal chloride.

10. The composition of claim 1 wherein said quaternizing agent is diethylbromomalonate.

11. The composition of claim 1 wherein said quaternizing agent is lauryl bromide.

12. The composition of claim 1 wherein said heterocyclic nitrogen base is 2-methyl-5-vinylpyridine.

13. The composition of claim 1 wherein said heterocyclic nitrogen base is 2-vinylpyridine.

14. The composition of claim 1 wherein said heterocyclic nitrogen base is 2-ethyl-5-vinylpyridine.

15. The composition of claim 1 wherein said heterocyclic nitrogen base is 5-methyl-2-vinylpyridine.

16. The composition of claim 1 wherein said heterocyclic nitrogen base is 2-isopropenylpyridine.

17. The composition of claim 1 wherein said solid inorganic oxidizing salt is ammonium nitrate.

18. The composition of claim 1 wherein said polymer is a homopolymer of said heterocyclic nitrogen base.

19. The composition of claim 1 wherein said polymer is a copolymer of said polymerizable heterocyclic nitrogen base and another polymerizable monomer selected from the group consisting of (a) a conjugated diene containing from 4 to 8 carbon atoms, (b) a polymerizable monovinyl compound selected from the group consisting of esters of acrylic and methacrylic acids, styrene, alpha-methyl styrene, alkyl styrenes, alkoxy styrenes, acrylonitrile, methacrylonitrile, methyl vinyl ketone, methyl isopropenyl ketone, methyl vinyl ether, vinyl acetate, vinyl chloride, vinylidene chloride, and halogen substituted styrene, and (c) mixtures of said monomers (a) and (b).

20. The composition of claim 19 wherein said conjugated diene is 1,3-butadiene.

21. A method for producing a solid propellant composition which comprises: forming an intimate admixture of (1) 100 parts by weight of a polymer of a polymerizable heterocyclic nitrogen base compound selected from the group consisting of vinyl substituted and isopropenyl substituted pyridines and quinolines, and nuclear alkyl substituted derivatives thereof wherein the nuclear alkyl substituent contains from 1 to 8 carbon atoms, (2) from 0.5 to 200 parts per 100 parts of said polymer of a metal oxide selected from the group consisting of magnesium oxide, zinc oxide, litharge, iron oxide, cadmium oxide, mercury oxide, tin oxide, calcium oxide, barium oxide, strontium oxide, vanadium oxide, cobalt oxide, nickel oxide, and mixtures of said oxides, (3) from 50 to 90 weight percent of the total composition of a solid inorganic oxidizing salt, and (4) an organic non-acid, elementary sulfur-free quaternizing agent capable of forming fourth and fifth valence bonds between the heterocyclic nitrogen atoms of said polymer and atoms other than hydrogen of said quaternizing agent, said quaternizing agent being employed in an amount from about 10 weight percent of the stoichiometric requirement to about 10 weight percent over the stoichiometric requirement necessary to quaternize the nitrogen atoms in said polymer when said composition is cured; and curing said admixture.

22. The method of claim 21 wherein said curing is effected by heating said admixture to a temperature within the range of from about 0 to about 175° C. for a period of time within the range from about 5 minutes to about 80 hours and under a pressure from about 0 to about 2,000 p.s.i.g.

23. The method of claim 21 wherein said polymer is a homopolymer of said heterocyclic nitrogen base.

24. The method of claim 21 wherein said polymer is a copolymer of said polymerizable heterocyclic nitrogen base and another polymerizable monomer selected from the group consisting of (a) a conjugated diene containing from 4 to 8 carbon atoms, (b) a polymerizable monovinyl compound selected from the group consisting of esters of acrylic and methacrylic acids, styrene, alpha-methyl styrene, alkyl styrenes, alkoxy styrenes, acrylonitrile, methacrylonitrile, methyl vinyl ketone, methylisopropenyl ketone, methyl vinyl ether, vinyl acetate, vinyl chloride, vinylidene chloride, and halogen substituted styrene, and (c) mixtures of said monomers (a) and (b).

25. The method of claim 21 wherein said conjugated diene is 1,3-butadiene.

26. The method of claim 21 wherein said metal oxide is magnesium oxide.

27. The method of claim 21 wherein said metal oxide is zinc oxide.

28. The method of claim 21 wherein said metal oxide is litharge.

29. The method of claim 21 wherein said metal oxide is iron oxide.

30. The method of claim 21 wherein said metal oxide is cadmium oxide.

31. The method of claim 21 wherein said quaternizing agent is benzotrichloride.

32. The method of claim 21 wherein said quaternizing agent is benzylchloride.

33. The method of claim 21 wherein said quaternizing agent is benzal chloride.

34. The method of claim 21 wherein said quaternizing agent is diethylbromomalonate.

35. The method of claim 21 wherein said quaternizing agent is lauryl bromide.

36. The method of claim 21 wherein said heterocyclic nitrogen base is 2-methyl-5-vinylpyridine.

37. The method of claim 21 wherein said heterocyclic nitrogen base is 2-vinylpyridine.

38. The method of claim 21 wherein said heterocyclic nitrogen base is 2-ethyl-5-vinylpyridine.

39. The method of claim 21 wherein said heterocyclic nitrogen base is 5-methyl-2-vinylpyridine.

40. The method of claim 21 wherein said heterocyclic nitrogen base is 2-isopropenylpyridine.

41. The method of claim 29 wherein said oxidant is ammonium nitrate.

No references cited.

UNITED STATES PATENT OFFICE
CERTIFICATE OF CORRECTION

Patent No. 3,055,782 September 25, 1962

James E. Pritchard et al.

It is hereby certified that error appears in the above numbered patent requiring correction and that the said Letters Patent should read as corrected below.

Column 10, line 35, for the claim reference numeral "29" read -- 21 --.

Signed and sealed this 26th day of March 1963.

(SEAL)
Attest:

ESTON G. JOHNSON
Attesting Officer

DAVID L. LADD
Commissioner of Patents